July 20, 1926.
E. A. KEELER
MEASURING DEVICE
Filed May 17, 1920
1,592,979
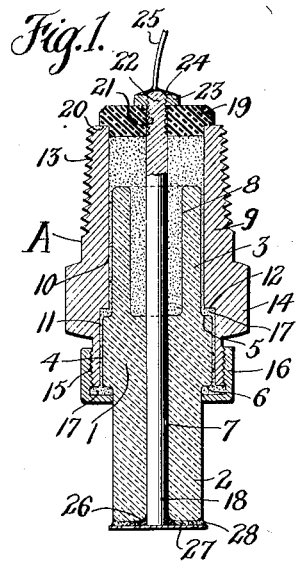
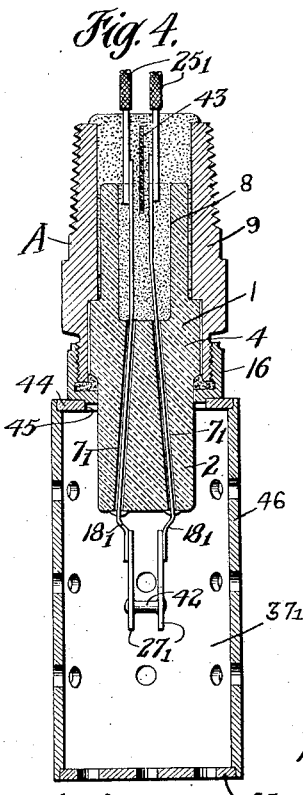
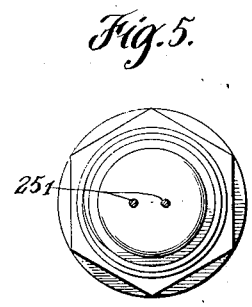
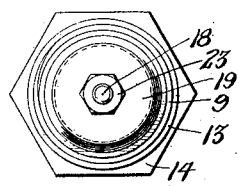
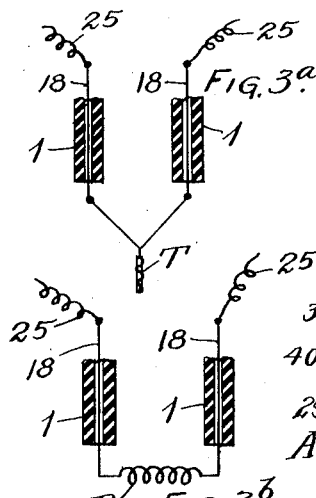
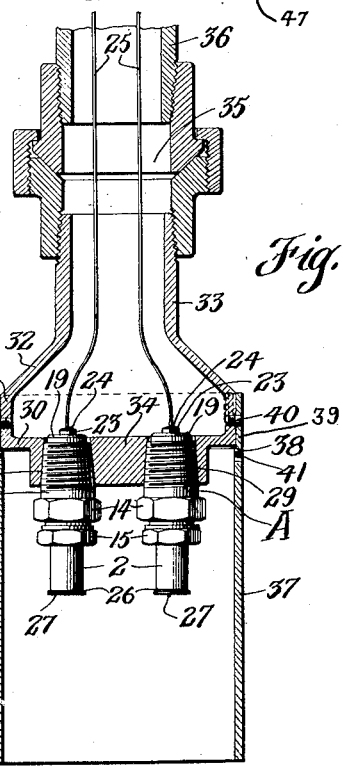
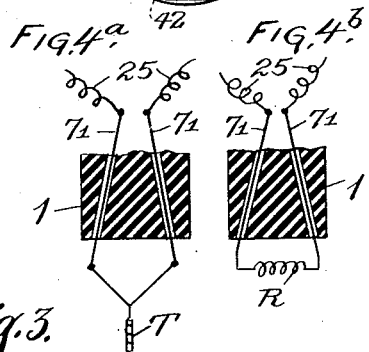
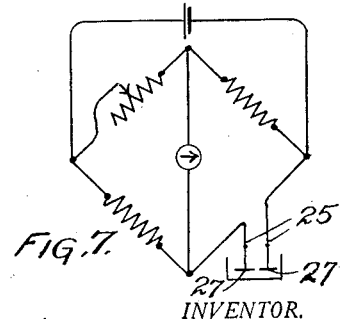
WITNESS.
Gustav Genzlinger.
INVENTOR.
Earl A. Keeler
BY Cornelius D. Ehret
his ATTORNEY Patented July 20, 1926.

1,592,979

UNITED STATES PATENT OFFICE.

EARL A. KEELER, OF NORRISTOWN, PENNSYLVANIA, ASSIGNOR TO LEEDS & NOR-
THRUP COMPANY, OF PHILADELPHIA, PENNSYLVANIA, A CORPORATION OF PENN-
SYLVANIA.

MEASURING DEVICE.

Application filed May 17, 1920. Serial No. 382,031.

My invention relates to a device or structure for making measurements respecting a condition or change of condition, such as temperature, conductivity and the like, of fluids, liquids, solutions and like media or bodies.

My invention relates more particularly to a device supporting an element or elements or a device which is to be subjected to a condition to be observed, measured or determined in a medium under observation.

My invention resides in plug structure carrying an electrical measuring element or an element or elements or a combination of elements responsive to a condition or change of condition to be measured or observed.

My invention resides further in plug structure of the character referred to combined with or in a supporting structure for subjecting the sensitive element or elements, or combination of elements, to a medium, and for protecting the same against injury, as by contact with other bodies.

My invention resides in features of structure and combination hereinafter described.

For an illustration of some of the forms my invention may take, reference is to be had to the accompanying drawings, in which:

Fig. 1 is a vertical sectional view of a plug structure.

Fig. 2 is a top plan view of the parts shown in Fig. 1.

Fig. 3 is a vertical sectional view of plug structure combined with a supporting structure and protecting casing.

Fig. 3ª is a fragmentary view of a modification employing a thermo-couple.

Fig. 3ᵇ is a fragmentary view of a modification employing a resistance.

Fig. 4 is a modified form of plug structure with a protecting casing.

Fig. 4ª is a fragmentary view of a modification employing a thermo-couple.

Fig. 4ᵇ is a fragmentary view of a modification employing a resistance.

Fig. 5 is a top plan view of the parts shown in Fig. 4.

Fig. 6 is a bottom plan view of the parts shown in Fig. 4.

Fig. 7 is a diagrammatic view of a measuring or testing circuit.

Referring to Fig. 1, A is a plug structure comprising member 1 formed of suitable insulating material, such as porcelain, having cylindrical end portions 2 and 3 of about the same diameter and a cylindrical middle portion 4 of larger diameter, forming shoulders 5 and 6. Through the axis of portions 2 and 4 is a tubular opening 7 communicating at its upper end with the cylindrical pocket 8 in portion 3. The member 1 is supported in a metal plug member or casing 9 having cylindrical portions 10 and 11, which snugly fit over portions 3 and 4, and a shoulder 12 abutting against shoulder 5. Casing 9 extends beyond the end 3 of member 1 and is screw threaded at 13 and 15. Between the threaded portions 13 and 15 is an enlarged portion 14 having flat sides for the application of a wrench.

Members 1 and 9 are held in fixed relation to each other by means of a collar 16 screw threaded upon the end 15 of casing 9 and engaging shoulder 6 of member 1. A suitable packing 17 of cotton or similar material may be placed between shoulders 12 and 5, and between shoulder 6 and the end of collar 16 before securing the parts together, as above described, to avoid breaking the insulating member 1, which is made ordinarily of porcelain or other fragile insulating material.

Extending through opening 7 and pocket 8 and the upper end of casing 9 is a conducting rod or wire, for example, a small brass rod 18, fitting snugly in opening 7 and extending slightly beyond the lower end of member 1. Pocket 8 and the upper end of casing 9 surrounding the rod 18 are filled to a short distance below the upper edge of casing 9 with a suitable insulating material, such as wax. The upper end of casing 1 is closed by a block 19 of insulating material, such as hard rubber extending into the end of the casing and into contact with the wax. Block 19 has a shoulder 20 engaging the end of casing 9 and an aperture 21 through which the threaded end 22 of rod 18 extends. Threaded upon the projecting end 22 of rod 18 is a nut 23 holding block 19 securely against the end of the casing. The nut 23 is held against removal from rod 18, and rod 18 is secured in electrical contact with a suitable electrical conductor 25 by means of solder 24.

The lower end of rod 18 projects beyond member 1 a short distance, and in the example herein illustrated, is secured by means of silver solder 26 to a platinum disk or plate 27. A slight space is allowed between plate 27 and the end of member 1, which is filled with insulating material 28, such as wax.

The above described structure or plug may be screwed into any suitable supporting structure for holding the platinum disk 26 in contact with a fluid liquid or solution the condition of which is to be determined.

In Fig. 3 I have illustrated two plugs of the type illustrated in Figs. 1 and 2 in a supporting structure. Referring to Fig. 3, plugs A are screwed into threaded openings 29, 29 in the thick portion 34 of plate or diaphragm 30, secured to or integral with a short tubular wall 31, from which extends upwardly and inwardly the conical wall 32, joined at its upper end to tubular wall 33. Diaphragm 30 is provided with screw threaded openings 29, 29 extending through the thickened portion 34.

The upper end of tubular wall 33 is screw threaded and joined through a union 35 with a tube or wire conduit 36, which may be of any suitable length. The tubular wall 31 carries a protecting casing 37 secured thereto in any suitable manner. As shown, casing 37 is cylindrical and of sufficient length to extend well below the ends of members A. The upper end of casing 37 is provided with a shoulder 38 abutting against the lower side of diaphragm 30 and a wall 39 fitting tightly around wall 31. Walls 39 and 31 are secured together by means of pins 40, and preferably also soldered. In the casing 37 adjacent diaphragm 30 is a plurality of perforations 41.

The modified form of plug illustrated in Fig. 4 comprises members 1 and 9, of the same shape and united in the same manner as in the plug structure illustrated in Fig. 1. Member 1 is provided with two ducts or openings $7_1$, $7_1$, extending through portions 2 and 4. Extending through openings $7_1$, $7_1$ is a pair of conductors $18_1$, $18_1$, of platinum, sealed in openings $7_1$, $7_1$ at the lower end thereof with any suitable cement, such as jeweler's wax. Conductors $18_1$, $18_1$ extend below the end of member 1 and support at their lower end two platinum disks or plates $27_1$, $27_1$. Plates $27_1$, $27_1$ are held apart by means of insulating spacers 42 made, for example, of glass.

Conductors $18_1$, $18_1$ extend upwardly through pocket 8 into the upper end of casing 9, where they are united, for example, by soldering with two insulated wires $25_1$, $25_1$. A sheet of mica 43 is placed between the joints between conductors $18_1$, $18_1$, and wires $25_1$, $25_1$, to ensure insulation of the two conductors from each other, and pocket 8 and the upper end of casing 9 are completely filled with insulating material, such as wax.

The plates or disks $27_1$, $27_1$ are protected by a casing $37_1$, comprising a top wall 44 provided with a central opening 45 surrounding the downwardly extending end 2 of member 1 and secured to collar 16 by any suitable means, for example, by soldering. Secured to top wall 44 is a cylindrical side wall 46 extending well below plates $27_1$, $27_1$ and closed at its lower end by bottom wall 47. Walls 46 and 47 are provided with a number of perforations to admit fluid into casing $37_1$ to contact with plates $27_1$, $27_1$.

The devices above described may be employed, for example, to measure the conductivity of a liquid. For this purpose two plugs, such as illustrated in Figs. 1 and 2, are mounted as illustrated in Fig. 3 and inserted into the liquid the conductivity of which is to be measured, conductors 25 connecting with a Wheatstone bridge, as indicated in Fig. 7, or other suitable circuit arrangement, in well known manner.

In place of platinum disks 27, 27 on the ends of the two plugs A in Fig. 3, I may secure to the rods 18 of the two plugs the two elements of a thermo-couple T, Fig. $3^a$, or a resistance wire R, Fig. $3^b$, may be connected between the rods 18 of the two plugs.

In the same way, the device illustrated in Fig. 4 may be inserted into a body of fluid for determining the resistance or conductivity of the fluid. In this device also the platinum plates $27_1$, $27_1$ may be replaced by the elements of a thermo-couple T, Fig. $4^a$, or by a resistance element R, Fig. $4^b$.

The conductors 25, 25 of Figs. $3^a$ and $4^a$ are connected to any suitable potential measuring device, as a potentiometer or voltmeter; and conductors 25, 25 of Figs. $3^b$ and $4^b$ are connected to any suitable resistance measuring device, as in an arm of a Wheatstone bridge, Fig. 7.

It is to be understood that my invention is not limited to any particular responsive or sensitive element or elements or combination of elements supported by the plug members, since obviously any element or combination of elements which produces an electrical effect, such as a flow of current or change of potential or resistance when subjected to a change in a condition such as temperature, conductivity and the like may be employed.

For the sake of brevity and clearness in the appended claims, the aforesaid responsive or sensitive elements, such as 27, $27_1$, T, R, etc., notwithstanding their characteristically different actions or modes of use, are generically referred to as "measurement-effecting" elements.

What I claim is:

1. Electrical measuring apparatus comprising the combination with a plate member, of a conduit extending from one side of said plate member, a casing extending from the other side of said plate member, a plurality of plug structures carried by said plate member and projecting into said casing, an electrode mounted upon each of said plug structures, and electrical conductors extending through said conduit and said plug structures and connected with said electrodes.

2. A detachable unit of electrical measuring apparatus comprising an insulating member having substantially cylindrical end portions, one of said end portions having a pocket, said insulating member having an opening extending therethrough and communicating with said pocket, a metallic plug member surrounding said one end portion of said insulating member and projecting beyond the end thereof, said plug member being screw-threaded on said projecting end, an electrical conductor extending through said opening, said pocket and said projecting end of said plug member for connection with electrical measuring apparatus, insulating material filling said pocket and the projecting end of said plug member and surrounding the portion of said conductor therein, and a measurement-effecting element supported upon the other end of said insulating member and electrically connected with an end of said conductor.

3. Electrical measuring apparatus comprising the combination with a conduit, of a supporting member carried upon the end of said conduit, plug structure carried by said member, a protecting casing supported upon said conduit and surrounding said plug structure, and a measurement-effecting device carried by said plug structure and disposed within said casing.

4. Electrical measuring apparatus comprising the combination with a supporting member, of a detachable unit comprising plug structure carried by said supporting member, a measurement-effecting element mounted upon an end of said plug structure, an electrical conductor connected with said element and extending through said plug structure for connection with electrical measuring apparatus, a protecting casing surrounding said plug structure and said element, and a conduit supported upon said supporting member.

5. Electrical measuring apparatus comprising the combination with a supporting member, of a detachable unit comprising plug structure carried by said supporting member, a measurement-effecting element mounted upon said plug structure, a protecting casing projecting from one side of said supporting member surrounding said plug structure, a conduit projecting from the other side of said supporting member, and an electrical conductor extending through said conduit for connection with electrical measuring apparatus and connected with said measurement-effecting element through said plug structure.

6. Electrical measuring apparatus comprising the combination of a plate member, of a conduit extending perpendicularly from one side of said plate member, a cylindrical casing extending perpendicularly from the other side of said plate member, said casing having a plurality of orifices adjacent said plate member, said plate member having a plurality of openings, a plurality of plug structures each having an end secured in one of said openings and an end projecting into said casing, electrodes carried by said projecting ends of said plug structures, and electrical conductors extending through said conduit and said plug structures and connected with said electrodes.

In testimony whereof I have hereunto affixed my signature this 15 day of May, 1920.

EARL A. KEELER.